March 31, 1931.    N. PELLEGRINO    1,798,952

VALVE

Filed Oct. 11, 1929

INVENTOR.
Nicola Pellegrino
BY
ATTORNEY

Patented Mar. 31, 1931

1,798,952

UNITED STATES PATENT OFFICE

NICOLA PELLEGRINO, OF JERSEY CITY, NEW JERSEY

VALVE

Application filed October 11, 1929. Serial No. 398,852.

This invention relates to new and useful improvements in a valve.

The invention has for an object the provision of a device of the class mentioned which is of simple, durable construction, dependable in use and efficient in action, and which can be manufactured and sold at a reasonable cost.

The invention proposes a casing with a fluid passage therethru, a flat plate constituting a valve head rotatively mounted within the casing transversely across said passage and formed with an opening alignable with said passage for the open position of the valve, means for urging the plate against a portion of the casing substantiating a water-tight seat, and means for moving the plate for opening and closing the valve.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Figure 1:
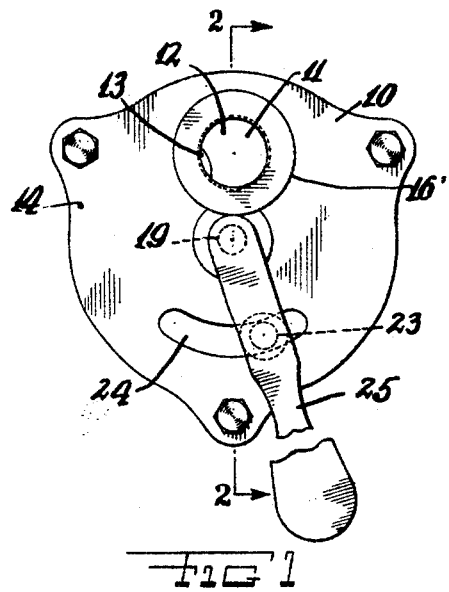
Fig. 1 is a front elevational view of a valve constructed according to this invention.

The valve consists of a casing 10 having a fluid passage 11 therethru, a flat plate 12 constituting a valve head rotatively mounted within the casing transversely across said fluid passage and formed with an opening 13 alignable with the said passage for the opened position of the valve, means for urging the plate against a portion of the casing substantiating a water-tight seat, and means for moving the plate for opening and closing the valve.

The said casing 10 consists of two sections, namely, as indicated by numerals 14 and 15 held together by bolts 16. The fluid passage 11 consists in aligned apertures in each of the sections 14 and 15. Bosses 16' encircle the apertures and are internally threaded for connection with pipes. The casing section 15 has a flat inner side 17 against which the flat plate 12 rests and the other section 14 is provided with a circular recess 18 housing the flat plate 12.

The flat plate 12 is mounted upon a shaft 19 arranged in the casing sections 14 and 15 and projecting from one of these sections, namely section 15. The plate 12 is formed with recessed portions 20 on its face adjacent the flat side 17 for the reduction of friction.

The means for urging the plate 12 against the flat surface 17 of the casing section 15 consists of a coaxial spring 21 arranged upon the shaft 19 and acting between the plate 12 and the section 14 and housed in a recess 22 encircling the shaft 19, and arranged partially in the section 14 and partially in the flat plate 12. This spring urges the flat plate 12 against the surface 17 for producing a water-tight seat.

The means for moving the flat plate 12 so that the aperture 13 aligns with the fluid passage 11 or so that it is out of line, consists of an eccentric peg 23 projecting from the plate 12 thru a slot 24 in the casing section 15. A handle 25 is engaged at one end upon the extended end of the shaft 19 and is formed with an aperture 26 into which the extended end of the peg 23 engages.

Figure 4:
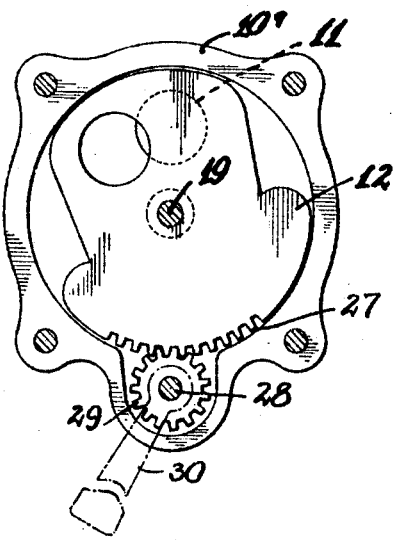
Fig. 4 is a view similar to Fig. 3 but of modified form.

In the modified form of the device illustrated in Fig. 4, a valve has been shown very similar in construction to the one previously described except that a modified means has been provided for moving the plate. This modified means consists of teeth 27 arranged on the plate 12 concentric with its center of rotation. A shaft 28 is rotatively mounted in the sections of its casing 10ª and carries a pinion 29 meshing with the teeth 27. A handle, indicated by dot and dash lines 30, is engaged upon the extended end of the shaft 28 and arranged for rotating the shaft so that the pinion causes the flat plate 12 to move about its axis.

Figure 5:
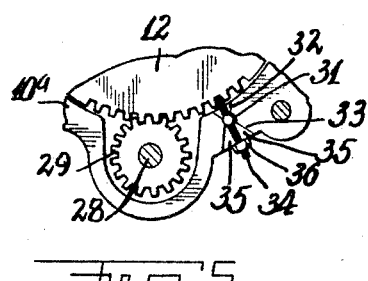
Fig. 5 is a view of a portion of Fig. 4 illustrating another embodiment.

In the modified form illustrated in Fig. 5, a means has been provided for latching the flat plate 12 in various adjusted positions. This means consists of a universal ball 31 mounted upon the casing 10ª which is provided with an inner flared opening 32 and an outer flared opening 33 communicating with the universal and with the interior and exterior of the casing, respectively. A screw 34 threadedly engages thru the universal ball 31 and engages between a pair of teeth of the flat plate 12.

Various wedge members of different sizes are provided with each of the valves and the correct size wedge members may be inserted in the outer flared opening 33 for holding the screw 34 in a fixed angular position. These wedges are indicated by reference numerals 35. A nut 36 engages upon the outer end of the screw 34 and holds the parts in locked position. The universal ball 31 and the flared openings permit the screw 34 to be angularly adjusted so that the tip properly engages between a pair of teeth of the plate 12.

Figure 2:
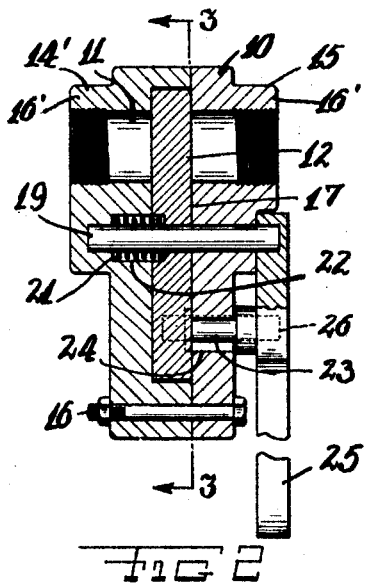
Fig. 2 is a vertical sectional view taken on the line 2—2 of Fig. 1.
Figure 3:
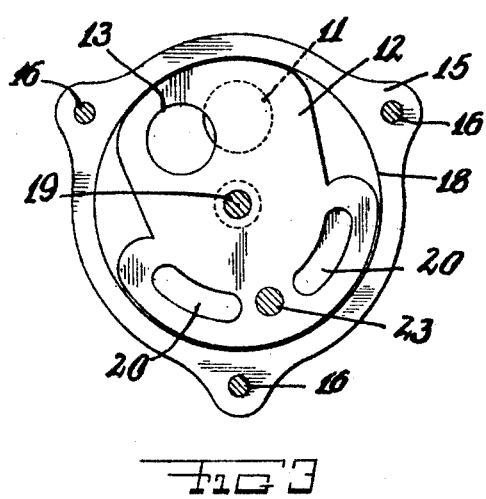
Fig. 3 is a vertical sectional view taken on the line 3—3 of Fig. 2.

In operation of the device, particular reference being had to Figs. 1 to 3 inclusive, the handle may be engaged upon the shaft 19 and on the peg 23 as shown in Figs. 1 and 2. Lateral movement of the handle then causes the flat plate 12 to pivot about the shaft 19 for opening or closing the valve. After the valve has been set, the handle 25 may be removed if this is desirable. The means for urging the flat plate 12 against its seat insures a water-tight joint regardless of which position the valve plate 12 may be in. It is contended that since the valve plate 12 merely slides relative to the stationary casing, there is little likelihood of leakage even after extensive use.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a device of the class described, a casing provided with an inner and outer flared opening, a flat plate constituting a valve head rotatively mounted within the casing and formed with teeth concentric with the point of rotation, a screw passing through the said opening and engaging between a pair of teeth of said plate, a universal ball threadedly engaged by said screw and mounted upon the casing in between the flared openings for permitting the screw to be angularly adjusted so that the tip properly engages between a pair of teeth of the plate, and means for holding said screw in fixed adjusted angular positions.

2. In a device of the class described, a casing provided with an inner and outer flared opening, a flat plate constituting a valve head rotatively mounted within the casing and formed with teeth concentric with the point of rotation, a screw passing through the said openings and engaging between a pair of teeth of said plate, a universal ball threadedly engaged by said screw and mounted upon the casing in between the flared openings for permitting the screw to be angularly adjusted so that the tip properly engages between a pair of teeth of the plate, and means for holding said screw in fixed adjusted angular positions, comprising a wedge member engaging in said outer flared opening, and a nut engaging on the outer end of the said screw for holding the parts in a locked position.

In testimony whereof I have affixed my signature.

NICOLA PELLEGRINO.